United States Patent [19]
Wood, Jr. et al.

[11] Patent Number: 5,894,266
[45] Date of Patent: Apr. 13, 1999

[54] METHOD AND APPARATUS FOR REMOTE MONITORING

[75] Inventors: Cliff Wood, Jr., Boise; David K. Ovard, Meridian; George E. Pax; John R. Tuttle, both of Boise, all of Id.

[73] Assignee: Micron Technology, Inc., Boise, Id.

[21] Appl. No.: 08/656,530

[22] Filed: May 30, 1996

[51] Int. Cl.$^6$ ...................................................... G08B 1/08
[52] U.S. Cl. ........................... 340/539; 340/506; 340/991; 455/54.1; 342/450
[58] Field of Search ............................ 340/539, 825.49, 340/825.36, 506, 825.06, 991, 993; 342/450, 352; 455/53.1, 54.1

[56] References Cited

U.S. PATENT DOCUMENTS

| Re. 32,856 | 2/1989 | Millsap et al. | 340/539 |
|---|---|---|---|
| 4,333,072 | 6/1982 | Beigel | 340/825.54 |
| 4,510,495 | 4/1985 | Sigrimis et al. | 340/825.54 |
| 4,525,713 | 6/1985 | Barletta et al. | 340/825.54 |
| 4,596,988 | 6/1986 | Wanka | 343/457 |
| 4,630,044 | 12/1986 | Polzer | 340/825.72 |
| 4,641,374 | 2/1987 | Oyama | 455/603 |
| 4,651,157 | 3/1987 | Gray et al. | 342/457 |
| 4,740,792 | 4/1988 | Sagey et al. | 342/457 |
| 4,819,053 | 4/1989 | Halavais | 342/353 |
| 4,857,893 | 8/1989 | Carroll | 340/572 |
| 4,904,983 | 2/1990 | Mitchell | 340/426 |
| 4,937,581 | 6/1990 | Baldwin et al. | 342/44 |

(List continued on next page.)

OTHER PUBLICATIONS

Amtech Awarded $5.6 Million Contract to Install and Maintain Toll Collection System; Dallas–Feb. 29, 1996; Transponder News (May 14, 1996);http://www.pix.za/trolley/news.html ;Amtech systems Corp.

Amtech to Install hands–free AEI System for Tracking Dillard's Mortor Freight Fleet; Dallas–Feb. 21, 1996; Transponder News (May 14, 1996; http://www.pix.za/trolley/news.html; Amtech Systems Corp.

Tagmaster Finds Wide Spread Applications; Jul. 1995 IEE Review; also Transponder News (May 14, 1996) http://www.pix.za/trolley/news.html; Tagmaster AB.

Texas Instruments and Rmote Ssytems Applications make Effective "TAG Team Against Auto Theft"; Attleboro, Mass.–Jan. 6, 1995;T.I> News Release; in Transponder News (May 14, 1996) at http://www.pix.za/trolley/news.html; Texas Instruments.

*Primary Examiner*—Edward Lefkowitz
*Assistant Examiner*—Daryl C. Pope
*Attorney, Agent, or Firm*—Walter D. Fields

[57] ABSTRACT

A remote intelligent communications device includes a primary RF communications port and an alternative modem communications port. The remote intelligent communications device receives configuration data for configuring the alternative modem communications port. The remote intelligent communications device obtains information data concerning a select attribute of an associated object. The information data is stored within internal memory of the remote intelligent communications device. Thereafter, the stored information data is retrieved, per one embodiment via the alternative modem port, from the remote intelligent communications device and analyzed for drawing conclusions regarding the select attribute of the associated object. Preferably, the remote intelligent communications device also includes a navigation (e.g. GPS) receiver that obtains navigation data, which navigation data is also stored within the internal memory of the remote intelligent communications device. By storing this navigation data together with the information data, once the stored data is retrieved from the remote intelligent communications device, the information data and navigation data can be analyzed for correlating the select attribute of the associated object with respective geographic position in accordance with the analyzed information and navigation data. In one exemplary application, the specific attribute is an open/close condition of a door of a cargo bay, monitored by an appropriate transducer disposed functionally proximate thereto.

30 Claims, 5 Drawing Sheets

U.S. PATENT DOCUMENTS

| | | | |
|---|---|---|---|
| 5,046,130 | 9/1991 | Hall et al. | 455/78 |
| 5,055,851 | 10/1991 | Sheffer | 342/457 |
| 5,334,974 | 8/1994 | Simms et al. | 340/990 |
| 5,406,263 | 4/1995 | Tuttle | 340/572 |
| 5,448,110 | 9/1995 | Tuttle et al. | 257/723 |
| 5,479,416 | 12/1995 | Snodgrass et al. | 371/37.1 |
| 5,519,621 | 5/1996 | Wortham | 340/825.49 |

METHOD AND APPARATUS FOR REMOTE MONITORING

BACKGROUND OF THE INVENTION

The present invention relates generally to remote intelligent communications devices, and more particularly relates to associated devices and methods of operation thereof for remotely monitoring particular physical parameter(s) individually, or collectively, at a remote location.

Radio frequency (RF) identification devices are available for identifying select animate, or inanimate, objects in accordance with unique identification codes. As a part of a remote monitoring system, an interrogator interrogates select RF identification devices, by way of an RF communications medium, and determines the presence of associated identified devices.

Integrity of the remote monitoring system depends largely upon the quality of the communication link between the interrogator and the RF identification devices. Various factors can influence this link, including: power levels of the signals propagated from the respective interrogator and identification devices, presence or absence of RF blocking obstacles between the interrogator and identification devices, distance between the interrogator and the identification devices, in addition to a presence or absence of interfering RF signals within the communication channel of the RF communications link. Accordingly, it would be advantageous to provide a remote monitoring device and system capable of providing continued communication capabilities when one, or more, of the above factors would otherwise degrade the integrity of the communications link.

Typically, the RF identification device is associated with an object (animate or inanimate) and provides simple identification thereof, with perhaps additional previously programmed information about the device—such as contents, desired destination, ownership, etc. However, in addition to providing such previously programmed information, it would be desirable to monitor a select attribute of the object and to record data regarding the select attribute over time. Additionally, it would be desirable to monitor and record a plurality of attributes regarding the object, so that thereafter, data regarding the particular attributes may be retrieved and analyzed for correlating one attribute with another separate attribute.

SUMMARY OF THE INVENTION

Accordingly, the present invention provides new remote intelligent communication devices, systems, and methods for remotely monitoring select attributes of a given object. A device and method of operation thereof, in accordance with one embodiment of the present invention, provides an alternative modem communication link for enabling communications with the remote intelligent communications device when, or should there be a risk that, the primary RF communications link will/would be corrupted. Additionally, the remote intelligent communications device, in accordance with another embodiment of the present invention, includes provisions for monitoring and recording several different attributes of the associated object over time, wherein data regarding the different attributes may be retrieved and correlated with respect to each other, or compared to predetermined desired data.

The present invention comprises a novel remote monitoring device having a demodulator coupled to a radio frequency communications port for receiving and demodulating an RF input signal. A controller controls various aspects of the remote monitoring device in accordance with command data received from the demodulator. A modulator modulates an RF signal that is directed away from the RF communications port in accordance with data stored within internal memory, and selectively as controlled by the controller. A transducer monitors a given physical parameter and provides a measurement signal in accordance with the given physical parameter while the navigation receiver provides appropriate navigation data in accordance with its associated geographic placement. Upon receiving appropriate command data, the controller is operative to store, within the internal memory, measurement data representative of the measurement signal as obtained by the transducer together with navigation data as obtained by the navigation receiver.

In a further embodiment of the present invention, the remote monitoring device can be employed within a remote monitoring system which further comprises a host control station that includes a library of command data for controlling the remote intelligent communications device through appropriate remote communications therewith. The host controller is programmably operative to retrieve select command data from the library of command data and send it to the remote intelligent communications device for enabling retrieval of stored measurement data and navigation data from the memory of the remote intelligent communications device. The host system further includes a data processor for analyzing the retrieved measurement and navigation data for providing reports representative of the physical parameter being measured and the associated geographic placement.

In a method of operating the above remote intelligent communications device, the remote intelligent communications device is configured appropriately for storing within its internal memory, measurement data representative of the measurement signal obtained by the transducer and navigation data as received by the navigation receiver. Thereafter, the command data is sent to the controller of the remote intelligent communications device for enabling reading of the measurement data and navigation data from the internal memory thereof.

In a further aspect of this method of operating the remote intelligent communications device, the transducer is associated with a door of a carrier cell for monitoring an open/close condition of the door, i.e. so as to provide a measurement signal in accordance with the open/close condition of the door. After enabling reading of data from the remote intelligent communications device, the stored measurement data and navigation data are retrieved and analyzed appropriately. Preferably, the analysis is used for correlating open/close conditions of the door of the carrier cell with associated geographic locations in accordance with the retrieved measurement and navigation data.

In another embodiment of the present invention, a novel remote intelligent communications device includes features for remotely monitoring a pressure parameter. The apparatus includes a remote intelligent communications device having a demodulator for demodulating an input signal as received from an RF communications port, and a controller for controlling operations of a remote intelligent communications device in accordance with command data obtained selectively from the demodulated input signal. The remote intelligent communications device also includes memory for storing measurement data therein representative of an external electrical signal received at a given monitoring port. To further assist communications, the remote intelligent communications device include a modulator for modulating an RF signal that is directed away from the RF communications port. A pressure transducer is coupled to the monitoring port of the remote intelligent communications device for providing an electrical signal in accordance with a pressure of its associated surrounding environment. In a further aspect of this embodiment, a navigation receiver, and/or a clock, is additionally provided for enabling logging of associated navigation and/or time data to be associated with the stored measurement data. In an alternative aspect of this embodiment, the pressure transducer is replaced with an accelerometer for monitoring acceleration experienced thereby.

DESCRIPTION OF THE PREFERRED EMBODIMENTS

Figure 1:
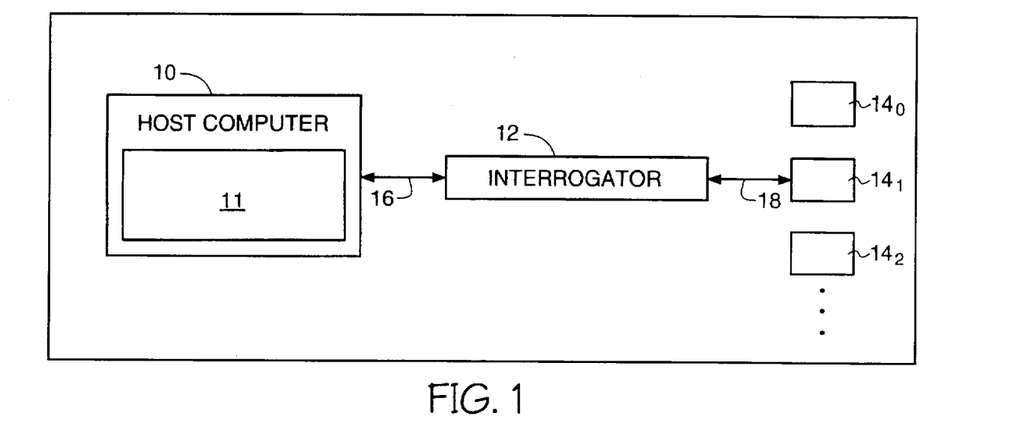
FIG. 1 is a simplified block diagram of a remote communications system for communicating selectively with particular remote intelligent communication devices.
Figure 2:
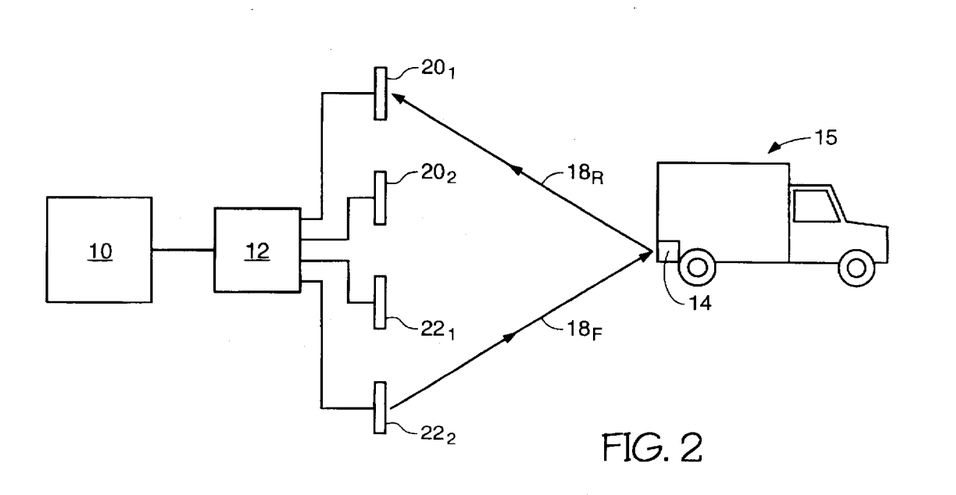
FIG. 2 is a block diagram illustrating forward and return communication links with a remote intelligent communications device as employed within a given remote communications system.

In a remote intelligent communication system, with reference to FIGS. 1 and 2, a host computer 10 communicates across a given communication medium 18 with a select remote intelligent communications device $14_1$ of a plurality of remote intelligent communication devices $14_0$, $14_1$, $14_2$. Typically, an interrogator 12 is employed intermediate host computer 10 and communications medium 18 for appropriately coupling host computer 10 to the medium 18. Preferably, host computer 10 has a library of commands 11 available for configuring and operating interrogator 12, remote intelligent communications device 14, and itself.

In an exemplary application, host computer 10, per appropriate programming, retrieves appropriate commands from within its library of commands 11 and sends the command data to interrogator 12 by way of a digital interfacing link 16. Preferably, digital interfacing link 16 is an enhanced parallel port (EPP) digital interface. The command forwarded from host 10 to interrogator 12 can be a command for configuring the interrogator, or a command for operating interrogator 12, or a command for configuring or operating remote intelligent communications device 14.

Upon receiving the command, interrogator 12 configures itself appropriately in accordance with the command instructions and/or forwards appropriate data along a forward RF communications link $18_f$ (as shown in FIG. 2) to remote intelligent communications device 14. Depending upon the type of command remote intelligent communications device 14 may respond with an appropriate return RF transmission $18_r$. If such a reply is received, interrogator 12 extracts digital data from the RF reply signal and forwards the reply message to host computer 10 for further analysis.

In a preferred embodiment of the present invention, host computer 10 is a computer compatible with Microsoft DOS™ and has a processor of performance equal to or greater than an 80486™ processor. Preferably, host computer 10 has an enhanced parallel port (EPP) for providing a digital interface 16 with interrogator 12. A library of commands for operating interrogator 12 and remote intelligent communication devices 14, are available in a software tool "Micron RFID Library (MRL)" available from Micron Communications, Inc. of Boise, Id. Appendix A, attached hereto, includes a copy of "Micron RFID Systems Developer's Guide", version 3.1, May 2, 1996, of Micron Communications, Inc. of Boise, Id., identifies software commands available within the MRL software tools, and how to employ such commands for configuring and operating a remote communications system.

In one embodiment of the present invention, remote intelligent communications device 14 comprises an Ambit™ remote intelligent communications device, available from Micron Communications Inc. of Boise, Id. In alternative embodiment of the present invention, device 14 comprises a Microstamp™ remote intelligent communications device, also available from Micron Communications, Inc. of Boise, Id. In most instances, the commands for operating these two devices are essentially the same; differences therebetween are described in the "Micron RFID Systems Developer's Guide" of appendix A.

Figure 3:
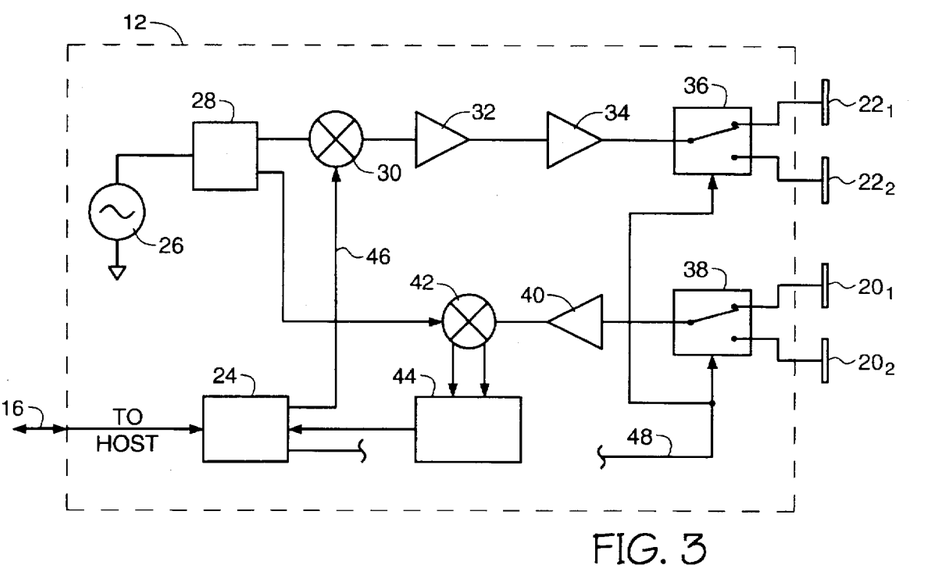
FIG. 3 is a simplified block diagram of an interrogator.

With reference to FIG. 3, interrogator 12 receives digital data by way of digital interfacing port 16 (e.g., EPP). Certain commands of the "Micron RFID Library" are associated with configuring interrogator 12. For example, interrogator 12 may receive a command for structuring appropriate transmit and receive antenna structures. A receive antenna structure, in one embodiment of the present invention, includes two separate antennas $20_1$ and $20_2$ selectively configurable for receiving an RF signal. Likewise, transmitting antennas structures $22_1$ and $22_2$ are selectively configurable for enabling transmission of RF signals away from interrogator 12. Diversity switches 36, 38 of the transmit and receiver communication paths respectively are configurable in accordance with configuration data received by digital controller 24. The diversity switches configure the respective antenna structures of the receiver and transmitter communication links of interrogator 12.

Amplifier 40 receives an RF input signal from the receiver antenna structure 20 (via diversity switch 38) and forwards an amplified representation of the received RF signal to a down converter 42. Down converter 42 receives a local Oscillator (LO) signal from an internal frequency synthesizer 26 via power divider 28. The LO signal mixes with the received RF input signal for providing an intermediate frequency (IF) output (e.g., I and Q outputs for full quadrature demodulation) which is forwarded to demodulator 44. Demodulator 44 demodulates the IF signal received from down converter 42 and recovers data therefrom in accordance with the modulation present on the IF Signal. Typically, digital controller 24 receives the recovered data and forwards it to host computer 10 by way of digital interface 16.

As part of a forward transmission chain, mixer 30 receives a carrier signal from frequency synthesizer 26 by way of power divider 28. The carrier signal is modulated in accordance with data established by digital controller 24. The resulting modulated output carrier is sent to amplifiers 32 and 34 for appropriate amplification before transmission to transmitter antenna structure 22 as selected in accordance with diversity switch 36. In one preferred embodiment, interrogator 12 is a 915 MHz backscatter interrogator, available from Micron Communications, Inc. of Boise, Id.

In the remote intelligent monitoring system depicted in FIG. 2, remote intelligent communications device 14 is associated with an automobile 15. However, in alternative applications, remote intelligent communications device 14 is associated with other animate or inanimate objects, including, but not limited to, luggage, a shipment package, an animal, a manufacturing assembly, a railway car, a water vessel, etc.

In the remote intelligent communications systems as described with reference to FIGS. 1 and 2, remote intelligent communications device 14 generally uses a line-of-sight RF path with reference to interrogator 12 in order to maintain integrity of the associated RF communications link 18 therebetween. Should obstacles or interference be encountered along the RF communication path, the communication link may be lost. In addition, transmission power limitations of interrogator 12 and remote intelligent communications device 14 can likewise affect the integrity of, and distal range available for, the RF communications link.

Figure 4:
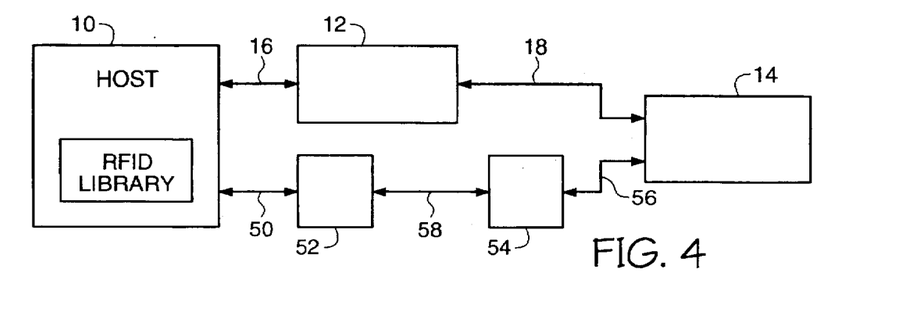
FIG. 4 is a block diagram of a remote communications system in accordance with one embodiment of the present invention.

In accordance with one embodiment of the present invention, an alternative modem link is provided between host computer 10 and remote intelligent communications device 14, as shown in FIG. 4. A modem 52 is coupled to host 10 via an appropriate modem interface 50. Preferably, interface 50 comprises an RS-232 data interface. Likewise, remote communications device 14 is coupled to another modem device 54 by way of an appropriate digital interface 56, preferably, an RS-232 compatible interface. Modem devices 52, 54 are coupled appropriately therebetween by way of an appropriate modem interfacing channel 58, preferably establishing a "transparent" alternative interfacing solution between host 10 and remote intelligent communications device 14. The alternative modem interface is alternative to the normal RF communications link 18.

In accordance with one aspect of this particular embodiment of the present invention, interfacing medium 58 between modem devices 52 and 54 comprises a wireless intercommunications medium, such as an alternative RF channel, an optical medium, or an acoustic medium. Modem devices 52, 54 comprise appropriate wireless modem devices for communicating therebetween via the associated wireless medium. In accordance with a second aspect, the interfacing medium 58 comprises a cellular network, and modem devices 52 and 54 are cellular modem devices for interfacing to a cellular network. Typically, the cellular modem devices and the cellular network employ analog cellular modulation technology for the communications link. Alternatively, and preferably, the cellular modem devices and cellular network employ a cellular digital packet technology that is more secure than an analog cellular communications link. In a third aspect in this embodiment of the present invention, modem devices 52 and 54 are satellite modem devices for enabling communications therebetween by way of a satellite link 58. Examples of the above modem devices are available from Motorola, Inc. and other modem manufacturers.

The above modem devices enable alternative communications between host computer 10 and remote intelligent communications device 14 in accordance with the respective wireless, cellular, and satellite links. Thus, should a remote intelligent communications device 14 be carried beyond its normal operating range associated with RF communications link 18, or should undue RF interference be encountered within the normal RF communications link 18; the host computer can attain an alternative communicate link with remote intelligent communications device 14 by way of the alternative modem devices 52, 54. Preferably, modem devices 52, 54 and associated digital interfacing, provide a transparent RS-232 interfacing solution between host computer 10 and remote intelligent communications device 14.

Figure 5:
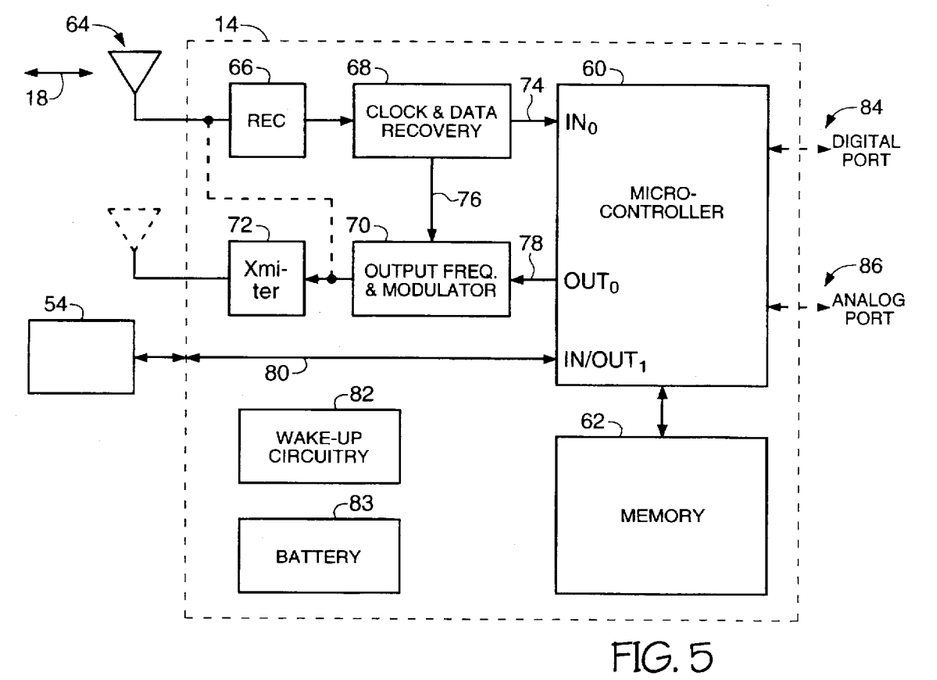
FIG. 5 is block diagram of a remote intelligent communications device integrated with an alternative communication channel in accordance with a particular embodiment of the present invention.

The remote intelligent communications device 14 is shown in greater detail in FIG. 5. In particular embodiments, remote intelligent communications device 14 comprises a Microstamp™ remote intelligent communications device, or an Ambit™ remote intelligent communications device, both of which are available from Micron Communications, Inc. of Boise, Id. Further details regarding a particular remote intelligent communications device 14 can be found in U.S. patent application Ser. No. 08/705,043, filed Aug. 29, 1996 entitled "Radio Frequency Data Communications Device", which claims priority from U.S. provisional application Ser. No. 60/017,900, filed May 13, 1996, assigned to the assignee of the present invention, and hereby incorporate by reference in its entirety. The block diagram of FIG. 5 is representative, generally, of both of the two different types of remote intelligent communication devices named above. However, differences do exist therebetween, a few of which will be explained hereinbelow.

Figure 6:
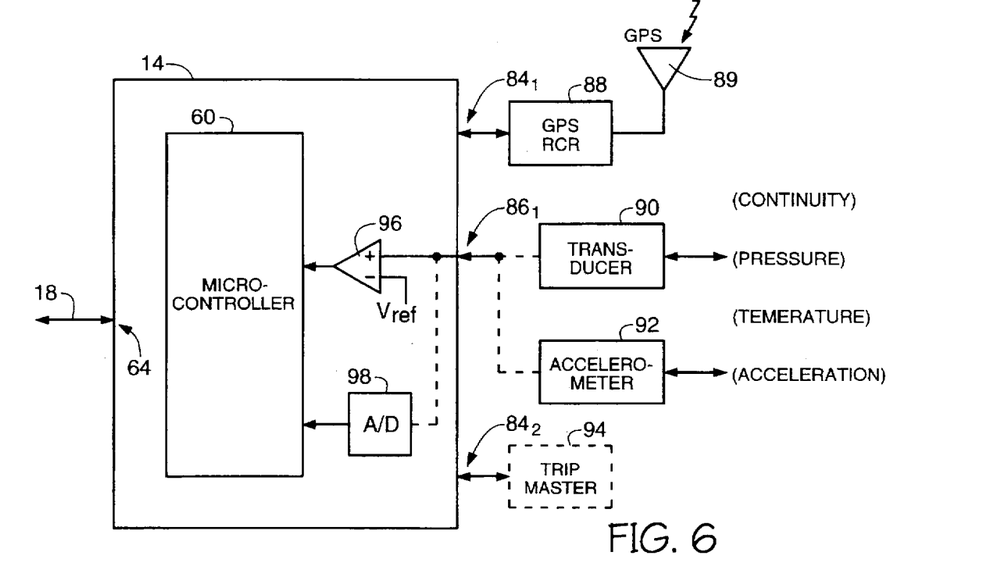
FIG. 6 is a block diagram of a remote intelligent communications device for monitoring various attributes of a remote object in accordance with various exemplary embodiments of the present invention.

With reference to FIGS. 5 and 6, normal RF communications with remote intelligent communications device 14 is established by way of an RF port 64. In one embodiment of the present invention, RF port 64 comprises a single antenna structure. In an alternative embodiment, two separate antennas are used, e.g., one for receiving and a second for transmission. Typically, receiver 66 includes appropriate down conversion, filtering, amplification, and detection circuitry. Receiver 66 is coupled to the RF port 64 for receiving an input RF signal. Receiver 66 forwards an appropriately received RF input signal to a clock and data recovery circuit 68. Clock and data recovery circuitry 68 receives an output signal as output from receiver 66 and recovers appropriate data therefrom. Additionally, clock and data recovery circuitry 68 recovers a clock signal having a frequency related to, and edges in synchronization with, the recovered data. In one embodiment of the present invention, a recovered clock 76 is sent to output frequency modulator 70. Output modulator 70 provides a carrier signal of a frequency related to the frequency of the recovered clock and modulates the carrier signal in accordance with desired data for an appropriate output transmission. Alternatively, an output transmission from remote intelligent communications device 14 utilizes the input RF signal itself as a carrier signal source within an alternative "backscatter" mode of operation, which will be described more fully hereinbelow.

In a particular backscatter embodiment of the present invention, antenna port 64 of remote intelligent communications device 14 includes a pair of conductive lines, forward and return conductive lines (not shown), as an input section to a dipole or loop antenna. To enable backscatter operation, as described more fully in U.S. patent application Ser. No. 08/705,043, entitled "Radio Frequency Data Communications Device" incorporated by reference hereinbefore, a switching element (not shown) is coupled between the forward and return conductive lines of the antenna structure proximate the antenna interface to the remote intelligent communications device 14. When the selective switch is closed, the impedance characteristics of the associated antenna will be different in comparison to the impedance characteristics thereof when the switch is open. Preferably, when the selective switch is open, the antenna provides a matched impedance, presenting an appropriate termination impedance to avoid reflections of RF signals of a given frequency as incident to the remote intelligent communications device 14. On the other hand, when the switching element is closed, preferably the device provides a short, shorting the forward and return conductive lines. Accordingly, RF signals received at the RF input port are reflected rather than terminated by the remote intelligent communications device 14. By modulating the matched and reflective characteristics of the antenna structure, via the open/short characteristics of the selective switch, a reflective RF signal can be selectively provided. The carrier frequency of the reflected RF signal will correspond to the carrier frequency of the incident RF signal, while the amplitude modulation of the reflected RF signal is established in accordance with the opening and closing of the selective switch.

In a preferred exemplary embodiment, the selective switch is a pin diode. Alternatively, the switching device is a Schottky diode, a bipolar transistor, or a FET transistor. The respective diode or transistor is functionally modulated in accordance with data to be sent out from remote intelligent communications device 14, i.e. the retrieved data.

Data recovered by the clock and data recovery circuitry 68 is forwarded as input data 74 to microcontroller 60. Input data 74 may comprise command data, in addition to associated configuration data or other forms of information. Microcontroller 60 interprets the input data appropriately for controlling operation of remote intelligent communications device 14. Such control may include configuration of desired digital ports 84, configuration of desired analog ports 86, partialing or allocation of memory 62, configuration of appropriate antenna structures at RF port 64, selection of desired input/output frequency channels, time duration and operation of wake up circuitry 86, and/or charging of, or distribution of current from, battery 83.

Figure 8:
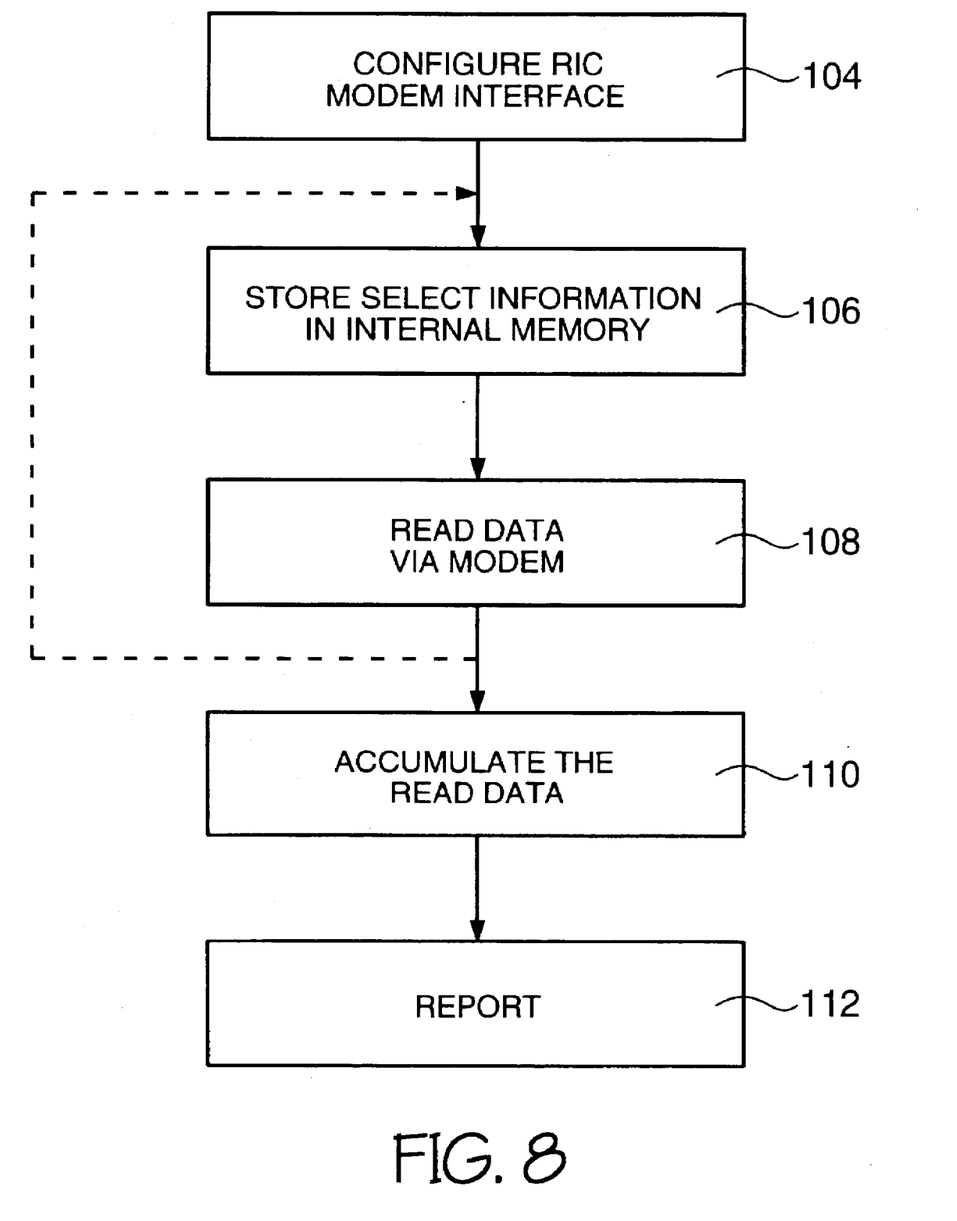
FIG. 8 is a high level flow chart characterizing a general method for operating a remote intelligent communications device in accordance with a particular embodiment of the present invention.

In addition, microcontroller 60 controls operation of alternative modem port 80 for selectively interfacing with the alternative modem device 54. Preferably, the interface between microcontroller 60 and modem 54 is an RS-232 digital interface. In such conditions, microcontroller 60 enables the alternative modem port for external communications, and configures (104 of FIG. 8) the alternative data modem for an appropriate baud rate, e.g. 2400, 4800, or 9600 bits per second.

One method of enabling and configuring modem 54 involves sending an appropriate command and accompanying configuration data to the remote intelligent communications device 14 by way of the primary RF interface 18. Microcontroller 60 interprets the command appropriately and enables the alternative modem port 80 by forwarding appropriate configuration data to an associated control register (not shown) within the remote intelligent communications device 14. Additionally, microcontroller 60 forwards the appropriate configuration data, as might be associated with the desired baud rate and appropriate communications protocol, to modem 54 for enabling proper communications with host 10.

Alternatively, remote intelligent communications device 14 may have select pins which can be hard-wired to an appropriate voltage potential, for example, ground or $V_{CC}$, such that whenever the remote intelligent communications device 14 powers-up, microcontroller 60 senses the fixed hard wired pins and configures itself appropriately, enabling the modem port 60 and appropriately configuring modem device 54 in accordance with the condition of the hard-wired pins. Another method of providing a power up configuration sequence comprises storing appropriate command and configuration data in nonvolatile memory within the remote intelligent communications device 14. At power-up, the command data and appropriate configuration data are retrieved from the nonvolatile memory and executed accordingly by microcontroller 60 during a power-up configuration sequence.

In the above embodiment, the interface between the remote intelligent communications device 14 and modem device 54 was described as an RS-232 interface. In an alternative embodiment, the interface between modem 54 and remote intelligent device 14 comprises a serial data link and a synchronization clock line for sending data therebetween in synchronization with an appropriate clock signal. This alternative interfacing topology is disclosed more fully in U.S. patent application Ser. No. 08/705,043, entitled "Radio Frequency Data Communications Device", filed May 13, 1996, incorporated hereinbefore.

In one exemplary embodiment of remote intelligent communications device 14, wake-up circuitry 82 senses when an appropriate RF input signal is received by receiver 66 and activates other portions of remote intelligent communications device 14 upon receiving a valid RF input signal and upon determining a valid interrogation protocol, compatible with the particular remote intelligent communications device 14. In an alternative embodiment of a remote intelligent communications device, wake-up circuitry 82 includes a self-timer that periodically forces an inquiry for determining the presence of an interrogation signal. When the self-timer times out at the end of a sleep mode, the wake-up circuitry 82 enables receiver 66 and clock and data recovery circuitry 68. Once these portions have been enabled, a further determination can be made as to whether or not a valid input signal is received. Upon determining a valid interrogation signal (per an appropriate interrogation protocol), the wake-up circuitry enables additional portions of the remote intelligent communications device 14 for full operation.

Battery 83 provides power to various elements of the remote intelligent communications device and is enabled appropriately by wake-up circuitry 82. During a sleep mode of operation, wake-up circuitry minimizes the amount of current drawn from battery 83. During alternative operating modes, wake-up circuitry 82 enables battery 83 to provide appropriated current flow to portions of remote intelligent communications device 14 as needed.

Additional information regarding wake-up circuitry 82 and associated protocol is available in the above incorporated U.S. Patent Application entitled "Radio Frequency Data Communications Device". Additional disclosure regarding sleep mode operation of a remote intelligent communications device is provided by U.S. patent application Ser. No. 08/424,827, entitled "Wake up Device for a Communication System", filed Apr. 19, 1995; which is a continuation of U.S. patent application Ser. No. 08/092,147, filed Aug. 15, 1993, which patent applications are assigned to the assignee of the present invention, and are hereby incorporated by reference in their entirety.

Additional information regarding a communication protocol between an interrogator 12 and a remote intelligent communications device 14 is available in some of the above incorporated U.S. Patent Applications, in addition to U.S. Pat. No. 5,500,650, entitled "Data Communication Method Using Identification Protocol", issued Mar. 19, 1996, filed Dec. 15, 1992, and U.S. Pat. No. 5,479,416, entitled "Apparatus and Method for Error Detection and Correction in a Radio Frequency Identification Device", issued Dec. 26, 1995, filed Sep. 30, 1993, which U.S. Patents are assigned to the assignee of the present invention and incorporated herein by reference in their entirety.

In a preferred exemplary embodiment of the present invention, with reference to FIGS. 5–8, remote intelligent communications device 14 has a first digital interfacing port $84_1$ tied to a navigation receiver, e.g., a global positioning systems (GPS) receiver 88. GPS receiver 88 receives select GPS satellite information, by way of an appropriately tuned GPS antenna 89. An additional digital IO port $84_2$ is selectively coupled to other monitoring circuitry 94, such as: a "trip master"™ of a delivery truck as is available from Rockwell International Corp., a continuity tester for monitoring a door of a delivery truck, or an analog-to-digital device that provides digital information to the remote intelligent communications device 14 representative of an analog measurement signal being sampled thereby. Analog IO port $86_1$ is selectively coupled to a transducer 90 (or alternatively, an accelerometer 92) for receiving an analog measurement signal in accordance with an associated continuity, pressure, magnetic field, temperature, or acceleration as measured by the respective transducer. Microcontroller 60 controls the configuration of the digital and analog IO ports 84, 86 respectively, in accordance with appropriate command and configuration data.

Preferably, remote intelligent communications device 14 also includes a comparator 96, and/or an analog-to-digital converter 98, which comparator and converter are selectively enabled by the controller in accordance with associated command and configuration data. In a select configuration, comparator 96 receives the analog signal of analog port 86, and compares this analog signal against a predetermined reference voltage $V_{ref}$. Comparator 96 then triggers a flag (or an alarm) to microcontroller 60; signaling that the voltage received at analog port $86_1$ is greater (or less) than the voltage $V_{ref}$. In an alternative select configuration, the analog signal received at analog port $86_1$ is coupled to the input of analog-to-digital converter 98. The analog-to-digital converter receives the analog input signal and converts the signal into a digital signal, i.e. measurement data representative of the analog voltage. The digital signal is forwarded to microcontroller 60 or an appropriate digital bus.

Figure 7:
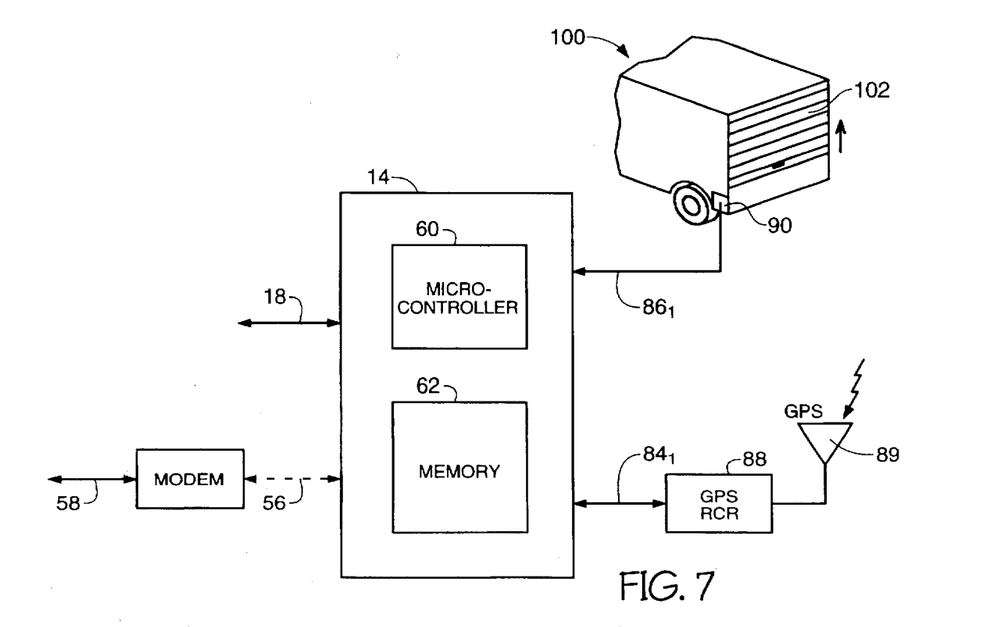
FIG. 7 is a block diagram of a remote intelligent communications device incorporated with a cargo bay of a delivery vehicle for monitoring a given condition thereof in accordance with another exemplary embodiment of the present invention.

In an exemplary application of one embodiment of the present invention, with reference to FIG. 7, a remote intelligent communications device 14 is employed for monitoring an open/close condition of a door 102 of a cargo bay 100 of, for example, a delivery truck. A transducer 90 is configured with cargo bay 100, proximate door 102, for determining when door 102 is opened or closed. For example, transducer 90 preferably comprises a magnetic transducer for sensing magnetic characteristics as may be associated with the opening/closing of door 102. Transducer 90 produces an analog signal representative of the open/close condition, that is forwarded to analog port $86_1$ of remote intelligent communications device 14. Although transducer 90 is described as a magnetic transducer, transducer 90 in an alternative exemplary embodiment is a continuity monitor, as employed and disclosed in U.S. Pat. No. 5,406,263, entitled "Anti Theft Method for Detecting the Unauthorized Opening of Containers and Baggage", issued Apr. 11, 1995, assigned to the assignee of the present invention, and hereby incorporated by reference.

Remote intelligent communications device 14 is configured appropriately (106 of FIG. 8) to monitor the input analog signal, perhaps via comparator 96, to determine when door 102 has been opened. Upon determining a door opening, microcontroller 60 records the condition appropriately. In accordance with one aspect of this embodiment of the present invention, comparator sends an interrupt to microcontroller 60 upon sensing an excessive signal at the analog part $86_1$. Alternatively, microcontroller 60 examines analog port $86_1$ periodically and checks the condition or status of door 102, as measured by transducer 90.

In addition to monitoring the condition of door 102, remote intelligent communications device 14 can record (106 of FIG. 8), per an appropriate configuration, information as received from a navigation receiver, such as GPS receiver 88, selectively coupled to digital port $84_1$. GPS receiver 88 receives GPS information by way of its GPS interconnect, e.g. antenna 89. Remote intelligent communications device 14 receives the GPS information and logs navigation data thereof into memory 62. In this fashion, coordinate information regarding a position of a delivery truck, i.e. cargo bay 100, can be associated with respective openings and/or closings of door 102. Subsequently, the stored measurement data as obtained by transducer 90, and stored coordinate data as obtained by navigation receiver 88, are retrieved from memory 62 and read (108 of FIG. 8) by host 10 via RF interconnect 18, or by way of an alternative modem communications channel as disclosed hereinbefore.

As data is read from the remote intelligent communications device 14, it is preferably accumulated (110 of FIG. 8) within host computer 10 for subsequent analysis. To assist this analysis, the accumulated measurement and coordinate data is imported into a given data analysis software tool. The data analysis tool provided can be a known spreadsheet analysis tool, such as, for examples, Excel™, Lotus™, Microsoft Access™, or similar available data analysis software tool. Alternatively, a custom data analysis program may be developed as suited for the particular remote monitoring application.

Appropriate macros are preferably developed, in a known fashion, for deriving meaningful conclusions or reports regarding the respective parameters retrieved from the remote interrogation communications device 14. In reporting (112 of FIG. 8) the monitored characteristics, a graph or chart is preferably compiled in accordance with the derived conclusions and portrayed appropriately on a given display (or print medium) using known audio and/or visual multimedia tools.

In a preferred exemplary method of the present invention, a particular measurement phenomenon, as monitored by a given remote intelligent communications device 14, is correlated with associated geographic position(s), time/date information, temperature, and/or other selective measurement event(s), in order to provide additional understanding of the particular measurement phenomenon. For example, when the particular measurement phenomenon concerns the opening or closing of a door, in can be correlated with an associated geographic position and/or time, for aiding determination of acceptable door opening/closing as opposed to an unacceptable door opening or closing. Furthermore, a temperature profile may be correlated with respective door openings and closings together with associated time intervals therebetween for determining excessive refrigeration or heating demands for temperature recovery. Thereafter, corrective actions may be taken as desired based upon the conclusions provided by the data analysis.

In the particular exemplary configuration disclosed above, transducer 90 is disclosed as a transducer external to remote intelligent communications device 14. In U.S. patent application Ser. No. 08/705,043 entitled "Radio Frequency Data Communications Device", incorporated hereinbefore, a remote intelligent communications device has an internal magnetic sensor associated therewith. The internal sensor can selectively monitor particular magnetic properties, as might be associated with door 102.

In further aspects of the above exemplary application, remote intelligent communications device also includes: a temperature transducer for simultaneously monitoring temperature, an accelerometer for monitoring shipping stability (shock), or interfacing circuitry for obtaining additional information from a "trip master" of an associated carrier vehicle 100. These various alternative input devices were described more fully hereinbefore with reference to FIG. 6.

It should be readily understood that the embodiments described and illustrated herein, are illustrated only, and are not to be considered as limitations upon the scope of the present invention. Other variations and modifications may be made in accordance of the spirit and scope of the present invention.

What is claimed is:

1. A method of remotely monitoring an aspect of an object, comprising steps of:

providing a remote intelligent communications device having:
memory for storing data,
a control register that retains configuration data to configure an architecture of the remote intelligent communications device, and
a plurality of radio frequency (RF) communication ports selectively enabled per configuration data of said control register, one of said ports comprising a cellular modem RF communications port, and another of said ports comprising a non-cellular RF communications port;

sending configuration data to said remote intelligent communications device by way of said non-cellular RF communications port;

storing said configuration data in said control register and enabling said cellular modem RF communications port;

storing data concerning an aspect of said object within said memory; and retrieving by way of said cellular modem RF communications port, data of said aspect from said memory.

2. A method according to claim 1, further comprising steps of repeating a plurality of times said steps of storing aspect data, and retrieving.

3. A method according to claim 1, wherein said cellular modem RF communications port comprises a satellite communication modem device and said step of retrieving comprises propagating the retrieved data onto a satellite communication link.

4. A remote monitoring system comprising:
a remote intelligent communications device having:
memory for storing data,
a non-cellular radio frequency or RF interface port,
a cellular modem RF interface port, and
a controller programmable to enable at least one of said non-cellular RF interface port and said cellular modem RF interface port, and send data of said memory externally by way of said at least one enabled port; and a monitoring station having:
an RF channel configurable for enabling RF communication with said remote intelligent communications device via said non-cellular RF interface port, and
a phone channel separate from said RF channel configurable for enabling communications with said remote intelligent communications device via said cellular modem RF interface port.

5. A remote monitoring system according to claim 4, wherein said cellular modem RF interface port comprises a satellite modem device for enabling communication over a satellite link.

6. A remote monitoring system according to claim 4, further comprising:
a transducer providing a signal representative of an attribute; and
circuitry coupled to receive said signal of said transducer and provide digital data representative of said signal;
wherein said controller is selectively programmable to store said digital data in said memory.

7. A remote monitoring system according to claim 6, wherein said transducer is a transducer from the group consisting of a pressure transducer, a temperature transducer, an acoustic transducer, a magnetic transducer, and an accelerometer.

8. A remote monitoring system according to claim 6, further comprising:
a clock providing time and date information;
wherein said controller is selectively programmable to receive time and date information from said clock and record the time and date information in said memory together with the digital transducer data.

9. A remote monitoring system according to claim 6, further comprising:
a global positioning system (GPS) receiver providing coordinate information in accordance with a geographic position;
wherein said controller is selectively programmable to receive and record the coordinate information in said memory together with the digital data.

10. A remote monitoring system according to claim 6, wherein said circuitry providing the digital data comprises an analog-to-digital converter, and said controller is selectively programmable to enable or disable operation of said analog-to-digital converter.

11. A remote monitoring system according to claim 4, wherein said remote monitoring system is disposed with a vehicle and further comprises:
a "trip master"™ that provides data regarding at least one parameter of said vehicle; and
wherein said controller is selectively programmable to receive data from said "trip master" and record data of said trip master in said memory.

12. A remote intelligent communications apparatus, comprising:
a Radio Frequency (RF) communications port;
a demodulator coupled to receive and demodulate an RF input signal of the RF communications port;
a cellular modem port separate from said RF communications port;
a controller selectively programmable to receive command data from at least one of said demodulator and said cellular modem port, and configure said remote intelligent communications device in accordance with the received command data;

a monitoring port for receiving an electrical signal;

a transducer providing an electrical signal coupled to said monitoring port;

memory for storing data, said controller selectively programmable to obtain and transfer data of said electrical signal into said memory;

a modulator selectively operable to modulate an RF signal directed away from said RF communications port;

said controller selectively programmable to drive at least one of said modulator and said cellular modem port with data of said memory, and forward said data external said remote intelligent communications apparatus by way of respective said at least one port.

13. A remote intelligent communications apparatus according to claim 12, wherein said transducer generates an analog electrical signal; and said apparatus further comprises an analog-to-digital converter coupled to receive and convert said analog electrical signal into a digital electrical signal.

14. A remote intelligent communications apparatus according to claim 12, further comprising:

a clock providing time and date information;

wherein said controller is selectively programmable to obtain and store time and date information of said clock in said memory.

15. A remote intelligent communications apparatus according to claim 12, further comprising:

a navigation receiver that provides navigation data in accordance with its geographic placement;

wherein said controller is selectively programmable and configurable to store said navigation data in said memory.

16. A remote intelligent communications apparatus according to claim 12, wherein said RF communications port comprises an antenna circuit having at least two conductive portions; and said modulator includes a selective RF switching device coupled between said two conductive portions.

17. A remote intelligent communications apparatus according to claim 16, wherein said antenna circuit includes a transmission line section having complimentary forward and return conductive paths; and wherein said selective RF switching device comprises a device from the group consisting of a Schottky diode, a pin diode, a bipolar transistor, or a FET transistor, disposed functionally between said forward and return conductive paths.

18. A remote intelligent communications apparatus according to claim 12, wherein said RF communications port of the remote intelligent communications device comprises a transmit antenna structure;

wherein said remote intelligent communications device further comprises a synthesizer; and wherein said controller is selectively programable to enable said modulator of the remote intelligent communications device to modulate a carrier signal of said synthesizer in accordance with data of said memory and transmit the modulated carrier signal by way of the transmit antenna structure.

19. A method of remotely monitoring an attribute, comprising steps of:

providing a remote intelligent communication device having:

a non-cellular RF communication port, a cellular modem port, separate from said RF communication port, a controller selectively programmable to control operation of the remote intelligent communications device in accordance with command data, and memory for storing data;

using a transducer to obtain an electrical signal representative of an attribute;

sending command data by way of said non-cellular RF communications port and enableing the remote intelligent communication device to store data of said electrical signal in said memory; and retrieving from said remote intelligent communications device data of said memory by way of said cellular modem port.

20. A method according to claim 19, further comprising:

obtaining coordinate data representative of a geographic position of the remote intelligent communications device; and storing said coordinate data in said memory.

21. A method of remotely monitoring a physical parameter comprising steps of:

providing a remote intelligent communications device having:

a non-cellular radio frequency or RF communications port, a cellular modem RF communications port separate from said non-cellular RF communications port, a controller that controls operation of the remote intelligent communications device in accordance with command data, and memory for storing data;

coupling a transducer with the remote intelligent communications device;

sending command data to the remote intelligent communications device by way of said cellular modem RF communications port and effecting storage of data of said transducer in said memory; and retrieving by way of said non-cellular RF communications port data from said memory.

22. A method according to claim 21, further comprising a step of recording in said memory coordinate data representative of a geographic position of the remote intelligent communications device.

23. A remote monitoring apparatus comprising:

a non-cellular radio frequency (RF) communications port;

a demodulator coupled to receive and demodulate a RF input signal of the non-cellular RF communications port;

memory for storing data;

a cellular modem port separate from said non-cellular RF communications port;

a transducer providing a measurement signal; and a navigation receiver that provides navigation data in accordance with its geographic placement;

a controller configured to receive command data from the demodulator and programmable to control operation of the remote monitoring apparatus in accordance with received command data;

wherein said controller is selectively programmable, per appropriate command data, to enable and store in said memory data representative of said measurement signal and navigation data obtained by said navigation receiver; and wherein said controller is further selectively programmable, per appropriate command data, to retrieve data from said memory and configure said cellular modem port to transmit the retrieved data.

24. A remote monitoring apparatus according to claim 23, further comprising:

a clock providing time and date information;

wherein said controller is selectively programmable, per appropriate command data, to configure and store, in said memory, time and date information of said clock.

25. A remote monitoring apparatus according to claim 23, wherein said navigation receiver provides navigation data representative of its geographic placement, time and date.

26. A remote monitoring apparatus according to claim 23, wherein said transducer provides said measurement signal in accordance with one of an electrical continuity, a pressure, a temperature, an acceleration, a light, or a magnetic field.

27. A remote monitoring apparatus according to claim 23, wherein said transducer senses an open/close condition of a door and provides said measurement signal in accordance with the open/close condition.

28. A method of remote monitoring comprising:

providing a remote monitoring device having memory;

receiving a signal from a transducer;

receiving navigation data from a navigation receiver;

storing within the memory, data of said signal and said navigation receiver;

sending, by way of a cellular radio communication link, command data to the remote monitoring device to enable a non-cellular radio frequency (RF) communication port separate from said cellular radio communication link; and reading from said remote monitoring device data of the memory by way of said non-cellular RF communication port.

29. A method according to claim 28, wherein said transducer provides said signal in accordance with an open/close condition of a door.

30. A monitoring communication system to monitor a remote attribute, comprising:

a remote intelligent communication device disposed at a first position, comprising:

memory having information representative of said attribute, a non-cellular radio frequency or RF transceiver port, a cellular modem port separate from said non-cellular RF transceiver port, and a controller selectively programmable to configure at least one of said non-cellular RF transceiver port and said cellular modem port and transfer information in/out of said memory by way of said at least one; and a host station disposed at a second position remote said first position, comprising:

a RF channel selectively configurable to establish communication with said remote intelligent communication device using said non-cellular RF transceiver port, and a phone channel separate from said RF channel, selectively configurable to establish communication with said remote intelligent communication device using said cellular modem port.

* * * * *